United States Patent

Kawamoto et al.

[15] 3,702,971

[45] Nov. 14, 1972

[54] BROADBAND MICROWAVE APPARATUS USING MULTIPLE AVALANCHE DIODES OPERATING IN THE ANOMALOUS MODE

[72] Inventors: Hiroshisa Kawamoto, Hightstown, N.J.; Elmer Lawrence Allen, Jr., Philadelphia, Pa.

[73] Assignee: RCA Corporation

[22] Filed: Sept. 20, 1971

[21] Appl. No.: 181,715

[52] U.S. Cl. ........................330/57, 331/99, 330/53, 330/56, 307/208

[51] Int. Cl. ..............................................H03f 3/60

[58] Field of Search.........331/99, 56, 107 T; 330/56, 330/53, 57; 307/318, 322, 208; 333/8, 32

*Primary Examiner*—Nathan Kaufman

*Attorney*—Edward J. Norton

[57] ABSTRACT

The electrodes of a first avalanche diode are shunt coupled to a microwave transmission line. The electrodes of at least two other avalanche diodes are also shunt coupled in opposite polarity to the microwave transmission line. The electrical separation between the diodes connected in opposite polarity and a broadband matching structure increase the bandwidth of operation of the avalanche diodes operating in the anomalous mode as an amplifier or oscillator when the diodes are reverse biased by an appropriate signal.

6 Claims, 2 Drawing Figures

INVENTOR.
Hirohisa Kawamoto &
Elmer L. Allen Jr.
BY Edward J. Norton
ATTORNEY INVENTORS
Hirohisa Kawamoto &
Elmer L. Allen Jr.
BY Edward J. Norton
ATTORNEY

BROADBAND MICROWAVE APPARATUS USING MULTIPLE AVALANCHE DIODES OPERATING IN THE ANOMALOUS MODE

The invention herein described was made in the course of or under a contract or subcontract thereunder with the Department of the Air Force.

DESCRIPTION OF THE PRIOR ART

The design and successful operation of microwave apparatus using avalanche diodes, operating in the anomalous mode, have been published in many reports. The paper by P. A. Levine and S. G. Liu, entitled "-Tunable L-Band High-Power Avalanche Diode Oscillator Circuit" presented at the ISSCC Conference, Philadelphia February 1969, describes the necessary boundary conditions which must be solved before an avalanche diode can be triggered into generating microwave oscillations in the anomalous mode. However, the demands for increased output power from microwave sources have led to the operation of multiple, shunt-mounted, avalanche diodes in a single microwave oscillator circuit. Such a circuit having limited bandwidth of operation has been described in a U.S. Pat. application, Ser. No. 129,805 entitled "-Microwave Apparatus Using Multiple Avalanche Diodes Operating In The Anomalous Mode" submitted on Mar. 31, 1971, by Hirohisa Kawamoto.

The use of microwave hybrids as power summers for individual sources have proved unsatisfactory because they increase the size and complexity of the microwave circuit. A push-pull circuit has been used for operation of two three terminal semiconductive devices. However, such an arrangement has the disadvantage of requiring microwave isolation between semiconductive devices, which is sometimes difficult to obtain.

A series coupling of avalanche diodes for a microwave source has the limitation of making it difficult to provide a proper heat sink, causing diode burn out problems if the heat sink is not sufficient. A parallel arrangement of avalanche diodes is more satisfactory, but the simple addition of shunt-mounted avalanche diodes will not solve all the peculiar boundary conditions required of avalanche diodes operating in the anomalous mode.

SUMMARY OF THE INVENTION

The electrodes of a first and second avalanche diode are shunt coupled across a microwave transmission line. The electrodes of a third avalanche diode are also shunt coupled across the microwave transmission line. The terminal polarity of the third avalanche diode is opposite to the terminal polarity of the first and second avalanche diodes.

A reverse bias signal, exceeding a predetermined threshold level, is coupled across the terminals of each diode for triggering them into operating in the anomalous mode over a broad band of desired microwave frequencies.

The electrical separation between the first avalanche diode electrodes and the third avalanche diode electrodes is different from the electrical separation between the second avalanche diode electrodes and the third avalanche diode electrodes, the difference in electrical lengths determining the bandwidth of operation.

A variable position microwave matching circuit is coupled to the microwave transmission line containing the avalanche diodes. The matching circuit will transmit energy over a broad band of desired microwave frequencies, and reflect energy at other undesired harmonics thereof.

Further features and advantages of the invention will become more readily apparent from the following description of specific embodiments, as shown in the accompanying drawings in which:

BRIEF DESCRIPTION OF THE DRAWINGS

Referring to FIG. 1, there is shown a schematic representation of a microwave apparatus incorporating the features of the present invention. The microwave apparatus uses multiple avalanche diodes operating in the anomalous mode to generate microwave oscillations over a broad frequency bandwidth. The electrodes of the avalanche diodes $D_1$, $D_2$ and $D_3$ are coupled to a microwave of r.f. (radio frequency) transmission line 16 with one electrode coupled to r.f. ground potential. The diodes $D_1$, $D_2$ and $D_3$ are coupled to the r.f. transmission lines 16 in a manner that has the electrode polarity of diode $D_3$ opposite to the electrode polarity of diodes $D_1$ and $D_2$. The avalanche diodes $D_1$ and $D_3$ are separated by an electrical length $S_1$ which is substantially $\lambda_1/ 2$, where $\lambda_1$ is the wavelength at a desired frequency of oscillation $f_1$. The diodes $D_2$ and $D_3$ are separated by an electrical length $S_2$ which is substantially $\lambda_2/2$, where $\lambda_2$ is the wavelength at a second desired frequency of oscillation $f_2$. This is illustrated in FIG. 1, by the microwave coupling of the anode 12 and cathode 11 of diodes $D_1$ and $D_2$ to the cathode 14 and the anode 13 of diode $D_3$ via the r.f. transmission lines 16 and the microwave bypass capacitors 15.

Figure 1:
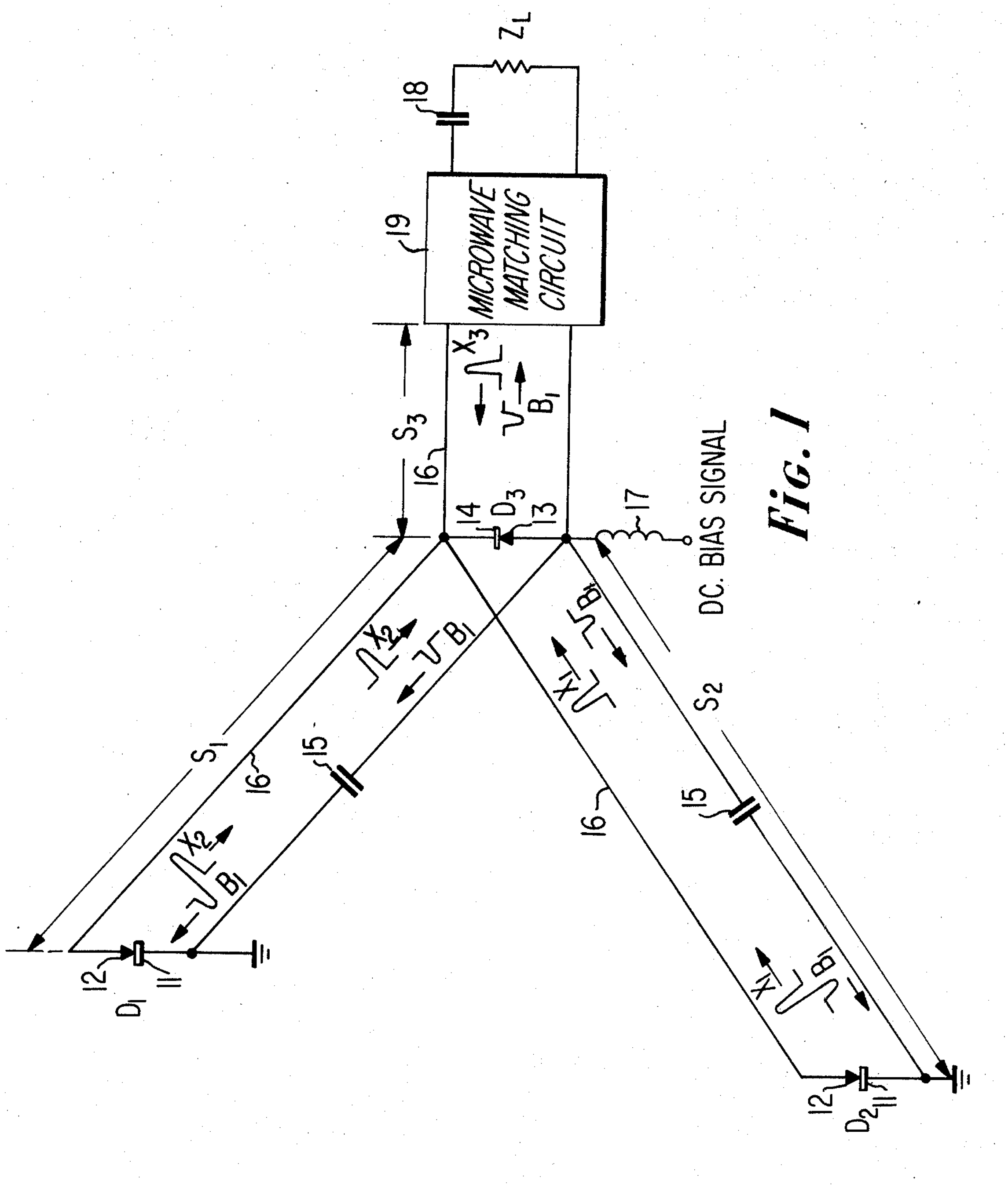
FIG. 1 is a schematic representation of a microwave avalanche diode apparatus utilizing concepts of the disclosed invention.

The avalanche diode operating in the anomalous mode, within an appropriate microwave circuit, is a two terminal negative resistance semiconductive device. An applied reverse bias signal, slightly greater than the breakdown voltage of the diode, will cause a displacement current or electric field in the depletion layer of the diodes semiconductive material. Carriers are created at the point of maximum electric field within the depletion layer. The carrier density is increased when the carriers collide with other atoms and create more carriers. The displacement current can also be considered as a wavefront, moving with a specific wave velocity, provided the displacement current has a very fast rise time. If the wave velocity of the displacement current is greater than the saturation velocity of the carriers, a high density of holes and electrons or carriers will be left in the wake of this wavefront. As a result of the concentration of holes and electrons, the electric field is reduced and the velocity of the carriers is diminished, leading to the formation of a dense plasma. Microwave energy is obtained from an avalanche diode by extraction of energy from the trapped plasma.

The necessary fast rise time of the displacement current can be achieved by utilizing the high frequency signals created by ionization at low currents. The high frequency signals trigger the avalanche diode into a high efficiency mode of operation, the anomalous mode. The avalanche diode then emits energy at a frequency which is related to the ratio of the depletion layer width to the velocity of the carriers in the plasma, and the design of the complementary microwave circuitry.

A D.C. reverse bias signal is applied to the anode 13 of diode $D_3$ through a biasing circuit that would prevent the leakage of microwave energy into the D.C. bias power supply, not shown. Such a biasing circuit may be a high inductance lead 17 that will appear as an open circuit at microwave frequencies. The microwave bypass capacitors 15 will allow the applied reverse bias signal to reverse bias all diodes, $D_1$, $D_2$ and $D_3$. The blocking capacitor 18 prevents the applied D.C. bias signal from coupling to the terminating load $Z_L$. The blocking capacitor 18 and the bypass capacitor 15 are designed to transmit microwave energy with little or no attenuation. The magnitude of the applied D.C. bias signal is sufficient to trigger each respective diode, $D_1$, $D_2$ and $D_3$, into generating microwave energy in the anomalous mode of operation. Diode $D_3$ generates a negative going microwave signal, $B_1$. Part of the negative going microwave signal, $B_1$, is transmitted along the r.f. transmission lines 16 toward diodes $D_1$ and $D_2$ and part toward the microwave matching circuit 19. The electrode polarity of diodes $D_1$ and $D_2$ is arranged so that the negative going microwave signal, $B_1$, aids the applied D.C. reverse bias signal in triggering diodes $D_1$ and $D_2$ into operating in the anomalous mode. Diodes $D_1$ and $D_2$ generate positive going microwave signals, $X_1$ and $X_2$ respectfully that are transmitted along the r.f. transmission lines 16 back toward diode $D_3$.

The combination of diodes $D_1$, $D_2$ and $D_3$ has a complex impedance that is matched to the output load impedance, $Z_L$, over a desired band of frequencies, including the frequencies $f_1$ and $f_2$, by the microwave matching circuit 19. The impedance of the microwave matching circuit 19 is designed to be substantially equal to the complex conjugate of the impedance of the diode combination over the desired band of frequencies. At frequencies harmonically related to the desired band of frequencies, the microwave matching circuit 19 is a reactive termination that reflects microwave energy. The reflected microwave energy $X_3$ is in the form of a positive going microwave signal that combines with the microwave energy generated by the diodes $D_1$ and $D_2$ and aids the applied D.C. bias signal in triggering diode $D_3$ and starting the cycle of operation once again.

The frequency of the energy generated by the diodes $D_1$, $D_2$ and $D_3$ is dependent on the round trip delay time for the energy generated by a first diode to be transmitted toward a second diode having an opposite electrode polarity. The second diode amplifies and transmits the generated energy back toward the first diode which is triggered into repeating the cycle. The cycle is repeated until all diodes, $D_1$, $D_2$ and $D_3$ are transmitting maximum power. The electrical length, S, between avalanche diodes is $$S=\lambda/2-\tau_d V_p \qquad (1)$$

where $\lambda$ is the wavelength in the media of microwave transmission at a frequency of interest. The internal delay time, $\tau_d$, is the time required of an avalanche diode before it can be triggered into operation. $V_p$ is the phase velocity in the media of microwave transmission. The electrical length, $S_1$ between diodes $D_1$ and $D_3$ is not equal to the electrical length, $S_2$, between diodes $D_2$ and $D_3$. Therefore, the frequency of the energy generated by the diode combination $D_1$ and $D_3$ is different from the frequency of the energy generated by the diode combination $D_2$ and $D_3$. The result is an increase in frequency bandwidth of operation of the microwave apparatus.

Figure 2:
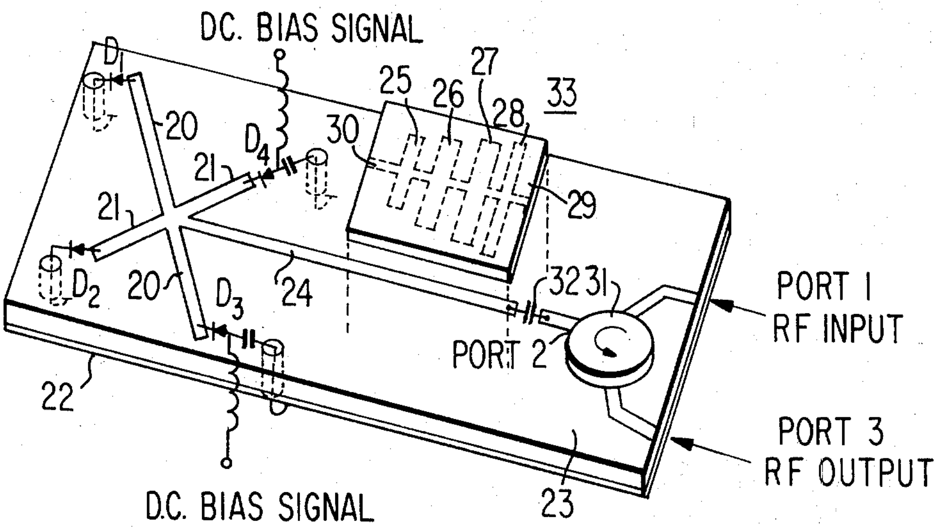
FIG. 2 is a top view of a broad band microstrip avalanche diode amplifier using four avalanche diodes reverse biased to operate in the anomalous mode.

Referring to FIG. 2, there is shown a top view of a microstrip amplifier using four avalanche diodes $D_1$, $D_2$, $D_3$ and $D_4$. The electrodes of the diodes are connected between r.f. transmission lines in the form of strip like conductors 20, 21 and a ground planar conductor 22. The strip like conductors 20, 21 are on one surface of a first dielectric substrate 23 and the ground planar conductor 22 is on an opposite surface of the substrate 23. The diodes are connected to the strip like conductors 20, 21 in a way that the electrode polarity of diodes $D_1$ and $D_2$ is opposite to the electrode polarity of diodes $D_3$ and $D_4$. The electrical length, $S_1$, of the r.f. transmission line 20 between diodes $D_1$ and $D_3$ is different from the electrical length, $S_2$, of the r.f. transmission line 21 between diodes $D_2$ and $D_4$. The electrical length, $S_1$, of the r.f. transmission line 20 between diodes $D_1$ and $D_3$ is selected to enhance the energy generated by these diodes at a first preselected frequency $f_1$. The electrical length, $S_2$, of the r.f. transmission line between diodes $D_2$ and $D_4$ is selected to enhance the energy generated by these diodes at a second preselected frequency $f_2$. The electrical length of the r.f. transmission line between diodes $D_1$ and $D_4$ is equal to the electrical length of the r.f. transmission line between diodes $D_2$ and $D_3$. Therefore, these diodes generate energy at a third preselected frequency $f_3$. The diodes $D_1$ and $D_2$ will not combine with each other to generate microwave energy because their electrode polarity is the same. The same is true for diodes $D_3$ and $D_4$. A third r.f. transmission line 24 is connected to the intersection of the r.f. transmission lines 20, 21.

A ferrite circulator 31 couples microwave energy from an external source, not shown, to the diodes $D_1$, $D_2$, $D_3$ and $D_4$. The electromagnetic properties of the circulator 31 transmits microwave energy coupled to port 1 of the circulator 31 to the third r.f. transmission line 24 connected to port 2 of the circulator 31. A D.C. reverse bias voltage is applied across the electrodes of the diodes $D_1$, $D_2$, $D_3$ and $D_4$. However, the magnitude of the applied D.C. voltage is not sufficient to trigger the diodes into operation. The applied r.f. signal transmitted along the third r.f. transmission line 24 combines with the applied D.C. voltage and triggers the diodes $D_1$, $D_2$, $D_3$ and $D_4$ into operation. Part of the microwave energy generated by the diodes $D_1$, $D_2$, $D_3$ and $D_4$ is transmitted back toward port 2 of the circulator 31. The electromagnetic properties of the circulator 31 transmits the diode generated microwave energy from port 2 to a load impedance, not shown, terminating port 3 of the circulator 31. The magnitude of the microwave energy coupled from port 3 of the circulator 31 to the terminating load is greater than the magnitude of the input microwave energy coupled to port 1 of the circulator 31.

The microwave matching circuit 33 used to match the diode impedance to that of a terminating load or source impedance consists of a series of multiple strip like conductive stubs 25, 26, 27 and 28 adjacent to one surface of a second dielectric substrate 29. The strip like stubs 25, 26, 27 and 28 are open circuited at both ends and parallel to each other. The mid points of the stubs 25, 26, 27 and 28 are connected together by a center strip like conductor 30. The microwave matching circuit 33 is positioned on top of the first substrate 23 so that the length of the center strip like conductor 30 on the second substrate 29 is in electrical contact with the third r.f. transmission line 24 on the first substrate 23. The reactance presented by the microwave matching circuit 33 to the diodes $D_1$, $D_2$, $D_3$ and $D_4$ is dependent on the width and length of the stubs 25, 26, 27 and 28. The reactance is also dependent on the electrical length of the transmission line between stubs and the magnitude of the relative dielectric constant of the first and second substrates 23, 29. The complex impedance of the diodes $D_1$, $D_2$, $D_3$ and $D_4$ is dependent on the magnitude of the applied D.C. and r.f. bias voltages as well as the desired frequency band of operation. The different lengths of the stubs are empirically designed to present a reactive termination to the diodes at frequencies harmonically related to the desired band of frequencies. The position of the microwave matching circuit 33, with respect to the diodes $D_1$, $D_2$, $D_3$ and $D_4$, is varied along the third r.f. transmission line 24 until maximum microwave energy over the desired band of frequencies is transmitted to the terminating load impedance $Z_L$. The D.C. blocking capacitor 32 connected between the microwave matching circuit 33 and the circulator 31 is used to prevent the transmission of the applied D.C. bias signal to the circulator 31. The impedance of the capacitor 31 is selected so that it presents little attenuation at microwave frequencies.

A microstrip amplifier of the type described in connection with FIG. 2 was built on a 0.031 inch dielectric substrate having a dielectric constant of 2.3. The microwave matching structure was built on a similar substrate. The amplifier transmitted a peak output power of 196 watts at 1.06 Ghz to a load terminating port three of the circulator. The maximum amplifier gain was 6.5 db and the 3 db bandwidth of operation was from 0.978 Ghz to 1.078 Ghz. The avalanche diodes used in the circuit of FIG. 2 which was built, was a punch through $pnn^+$ silicon mesa structure. The diameter of each of these diodes was approximately 0.020 inch. The junction of the respective diodes was formed by boron diffusion into n-type silicon epitaxial wafers. The resistivity of the epitaxial layer was approximately 6 ohm-cm. The breakdown voltage of the respective diodes were in a range from 120 to 150 volts. The physical separation between diodes $D_1$ and $D_3$ was 8.3 cm. and the physical separation between diodes $D_2$ and $D_4$ was 7.8 cm.

A preferred embodiment of the microwave apparatus has been shown and described in the form of a broadband microstrip amplifier. Various other embodiments and modifications thereof will be apparent to those skilled in the art, and will fall within the scope of invention as defined in the following claims.

What is claimed is:

1. Microwave apparatus operative over a desired band of frequencies, said apparatus comprising:

first, second and third avalanche diodes operative in the anomalous mode and each having electrodes, a microwave structure, the electrodes of said first, second and third avalanche diodes being shunt coupled across said microwave structure with the electrode polarity of said first and second avalanche diodes being opposite to said third avalanche diode electrode polarity, means for applying a reverse bias signal, exceeding a predetermined threshold value, across said electrodes of each of said diodes, to effect said avalanche diodes being triggered into said anomalous mode of operation, said microwave structure and said first and second diodes being arranged in cooperative relationship with respect to one another and said third diode to provide a predetermined delay of a microwave signal propagated along said microwave structure between said first and third diodes and a different predetermined delay of a microwave signal propagated along said microwave structure between said second and third diodes, said desired band of frequencies being dependent on said predetermined delays, means for coupling a variable position microwave matching circuit to said microwave structure, the microwave impedance of said matching circuit being substantially the complex conjugate of the impedance of said diodes over said desired band of frequencies and providing a path of low microwave attenuation for energy in said desired band of frequencies, said circuit being a reactive termination at frequencies harmonically related to said desired band of frequencies to thereby reflect energy at said harmonically related frequencies, said diodes being positioned with respect to said microwave matching circuit so that said reflected energy is of proper phase to aid in triggering said avalanche diodes into said anomalous mode of operation.

2. Microwave apparatus according to claim 1, wherein said microwave structure comprises a first, second and output microwave transmission lines, and wherein said diode arrangement comprises spacing said first and third diodes by a given distance of said first line, wherein said given distance has an electrical length, S, of substantially, $$S=\lambda/2-\tau_d V_p$$

where $\lambda$ is a first wavelength within said desired band of frequencies, $\tau_d$ is the response time exhibited by a triggered avalanche diode in achieving operation, and $V_p$ is the phase velocity in the media of microwave transmission, said second and third diodes being spaced by a given distance of said second line, wherein said given distance has an electrical length, $S_2$, of substantially, $$S_2=\lambda_2/_2-\tau_d V_p$$

where $\lambda_2$ is a second wavelength within said desired band of frequencies, $\tau_d$ is the response time exhibited by a triggered avalanche diode in achieving operation, and $V_p$ is the phase velocity in the media of microwave transmission, said output transmission line being coupled between said third diode and said microwave matching circuit.

3. Microwave apparatus according to claim 1, wherein said microwave matching circuit comprises a series of parallel strip like conductors having different electrical lengths and magnitudes of impedance and a center strip like conductor bisecting said parallel conductors, said strip like conductors being adjacent to one surface of a first and second dielectric substrate, said second dielectric substrate forming part of said microwave structure and separating said strip like conductors from a ground conductor on a surface opposite said one surface.

4. Microwave apparatus in accordance with claim 1, wherein said reverse bias signal is a D.C. voltage having a magnitude which in and of itself exceeds said predetermined threshold level, whereby said avalanche diodes oscillate at a desired frequency.

5. A microwave apparatus in accordance with claim 1, wherein said reverse bias signal is the sum of a D.C. voltage having a magnitude less than said predetermined threshold value and the amplitude of an applied microwave bias signal having said desired band of frequencies, said sum having a magnitude exceeding said predetermined threshold value, whereby said avalanche diodes are triggered into amplifying said applied microwave bias signal.

6. A microwave apparatus in accordance with claim 5, including a directional circulator having one port coupled to said microwave matching circuit, said circulator having a second port for applying said microwave bias signal to said avalanche diode terminals through said microwave matching circuit and a third port for applying said amplified microwave bias signal to a terminating load impedance.

* * * * *